United States Patent [19]

Atkinson et al.

[11] Patent Number: 5,785,801
[45] Date of Patent: Jul. 28, 1998

[54] APPARATUS FOR COVERING A TEXTILE DYE TUBE

[75] Inventors: Leon Eric Atkinson, Siler City; Joseph Stanley Taylor, Asheboro; Paul Hier Miller, Greensboro, all of N.C.

[73] Assignee: Technimark, Inc., Asheboro, N.C.

[21] Appl. No.: 646,614

[22] Filed: May 8, 1996

[51] Int. Cl.$^6$ .............................. B32B 31/00; B65H 81/00
[52] U.S. Cl. .................. 156/450; 156/446; 156/449; 156/455; 156/458
[58] Field of Search .............................. 156/215, 218, 156/285, 446, 449, 450, 455, 458; 242/118.11; 68/198; 210/494.1; 8/155, 155.1, 155.2

[56] References Cited

U.S. PATENT DOCUMENTS

| | | |
|---|---|---|
| 2,621,823 | 12/1952 | Perry . |
| 3,106,725 | 10/1963 | Stiner et al. ............... 68/198 |
| 3,577,293 | 5/1971 | Ritterhoff . |
| 3,764,425 | 10/1973 | Neff et al. .................. 156/218 X |
| 3,778,321 | 12/1973 | Abbott . |
| 3,997,929 | 12/1976 | Schultheiss et al. ......... 68/198 X |
| 4,181,274 | 1/1980 | Burchette, Jr. . |
| 4,366,016 | 12/1982 | Golden, Jr. ............... 156/218 |
| 4,385,480 | 5/1983 | Burchette, Jr. . |
| 4,555,296 | 11/1985 | Burtch et al. ............. 156/446 |
| 4,581,083 | 4/1986 | Schutz et al. . |
| 4,621,508 | 11/1986 | Baxley, Jr. et al. . |
| 4,702,433 | 10/1987 | Gilliam et al. . |
| 5,217,562 | 6/1993 | Macchiarulo et al. . |
| 5,445,335 | 8/1995 | Hallmann et al. . |

OTHER PUBLICATIONS

Schultheiss, W. Melliand Textilber (Germany), vol. 59, No. 4 (1978) pp. 324–326.

*Primary Examiner*—Jeff H. Aftergut
*Attorney, Agent, or Firm*—Rhodes Coats & Bennett, L.L.P.

[57] ABSTRACT

An apparatus for securing a sheet of filter material about the circumference of a dye tube. The apparatus includes a mandrel support table having a tube loading station, a sheet wrapping station, a sealing station, and a discharge station; hollow, air permeable mandrels supported on the table; a table drive to sequentially index the mandrels to each of the stations; a vacuum chamber extending from the tube wrapping station to the sealing station to draw a vacuum inside each mandrel at and between the wrapping and sealing stations; a tube feeder for feeding tubes onto mandrels at the tube loading station; a sheet feeder for feeding sheets of filter material into engagement with tubes at the wrapping station; a mandrel drive for rotating each mandrel at the wrapping station to wrap the sheet around the circumference of a tube supported on the mandrel; and a sealer at the sealing station for sealing the sheet to itself to cover the tube.

19 Claims, 4 Drawing Sheets

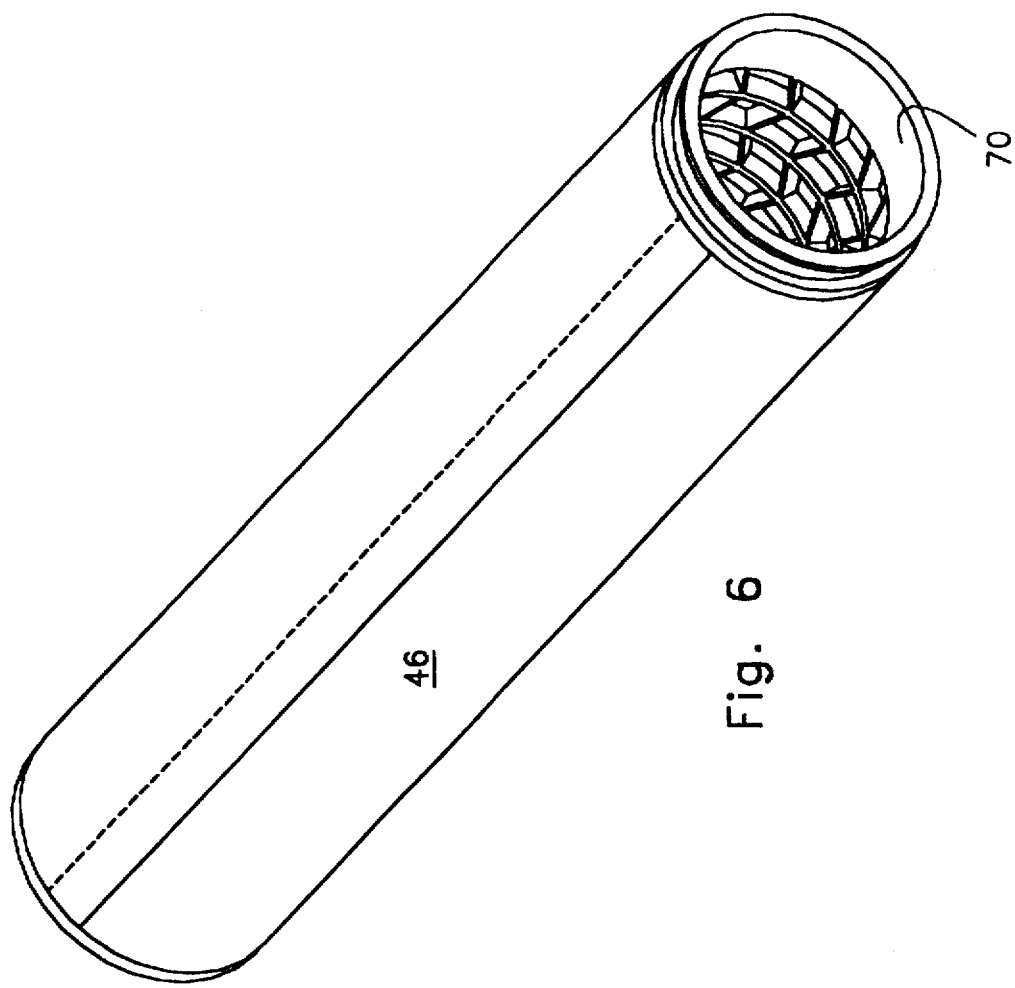
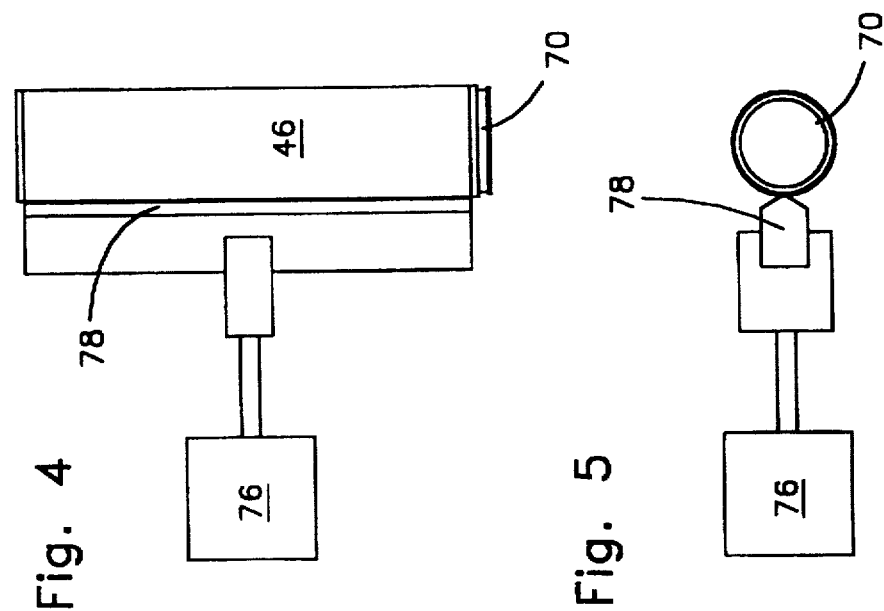

5,785,801

1

APPARATUS FOR COVERING A TEXTILE DYE TUBE

BACKGROUND OF THE INVENTION (1) Field of the Invention

The present invention relates generally to dye tubes for textiles and, more particularly, to a method and apparatus for securing a sheet of filter material around a yarn tube of the type used as a carrier during dyeing or finishing.

(2) Description of the Prior Art

Yarn is commonly wound around a supporting tube or carrier in preparation for dyeing or finishing. A plurality of yarn carrying tubes are then positioned onto a spindle and immersed in a dye bath or other treatment bath. The tubes also may be axially compressed on the spindle to permit increased loading and improved uniformity of dye penetration by reducing the tension of the yarn on the package.

Modern dye tubes are normally formed of a molded plastic, such as polypropylene, and have a plurality of peripherally extending ribs, often of a circumferential or helical configuration, connected by flexible joining members. The ribs and joining members together form an open structure permitting dye or other liquids to enter the yarn from the hollow interior of the dye tube. Such tubes are shown in U.S. Pat. Nos. 4,702,433 and 5,445,335, the entire disclosures hereby incorporated by reference.

These perforated dye tubes may be covered with a permeable sleeve or covering to filter the dye bath before the bath contacts the yarn and to help prevent the yarn from being trapped in the compressed tube. Historically, this sleeve was formed of paper. However, since most dye tubes are now recycled after use, the sleeve can be of the same general chemical composition as the tube. For example, the tube may be of injection molded polypropylene and the sleeve may be formed of a sheet of spun-bonded, nonwoven polypropylene fibers.

Since dye tubes are subjected to physical stress and high temperatures during use, it is necessary to ensure that the sleeve is securely fastened about the circumference of the dye tube. In addition, the sleeve must by positioned around the tube in an rapid and economical manner.

U.S. Pat. No. 4,385,480 to Burchette, Jr., and U.S. Pat. No. 4,621,508 to Baxley, Jr., are examples of prior art methods and apparatus for wrapping a sleeve around a dye tube, the entire disclosures hereby incorporated by reference. Generally, the technique described in these patents involves feeding tubes positioned end-to-end along an axial pathway while rotating the tubes. A continuous band of covering material is then fed along an angular path to the tubes at a covering station, where the band is wrapped in a spiral about the tubes with the edges of the band being overlapped.

The covering is then adhered to itself and to the tube at the overlap of the sheet edges to form the sleeve. In the Burchette, Jr. patent, the covering material is paper, and the adhesion is achieved with heat and glue, while the covering is the Baxley, Jr. patent is spunbonded, nonwoven polypropylene and the adhesion is with ultrasonic welding without glue. The band is then cut at the joinder of the tubes to form the finished product. Heating and gluing is complicated and ultrasonic welding is expensive but Baxley, Jr specifically taught that heating alone could not be used to provide adequate sealing of the edges of the sheet.

Thus, a need exists for a method and apparatus for securely attaching a covering to the outer surface of a dye tube in a rapid and economical manner while, at the same time, does not require the use of glue or ultrasonic welding and overcomes the problems of using heat to seal the fabric edges.

SUMMARY OF THE INVENTION

The present invention is directed to a method and apparatus for covering a dye tube with a permeable covering, and to the resultant product. In the preferred embodiment, the invention includes a mandrel for supporting a dye tube; a sheet feeder positioned to convey a sheet of filter material to a dye tube carried on the mandrel; wrapping means from wrapping the sheet about the circumference of the tube; and sealing means for bonding the sheet to itself and to the tube.

Also, in the preferred embodiment, the sheet is of a rectangular shape with leading and trailing edges spaced at a distance greater than the circumference of the tube, so that the leading and trailing edges of the sheet will overlap when the sheet is wrapped around the tube circumference. During feeding, the sheet is positioned with the leading edge parallel to the axis of the tube. Thus, when the sheet is wrapped around the tube, the overlapping edges of the sheet or seam will be parallel to the axis of the tube.

In order to achieve rapid and economical production the above apparatus may further include a tube feeder for feeding tubes to the mandrel and a tube unloader for removing covered tubes from the mandrel.

The mandrel used to support the dye tube during wrapping includes a continuous air permeable cylindrical wall with a covered distal end. A vacuum means communicates with the mandrel interior to draw air inwardly through the mandrel perforations, and thus the wall of the tube positioned on the mandrel to draw the sheet against the outer circumference of the tube. A drive means is also provided to rotate the mandrel during wrapping.

The invention may also include a turntable having a mandrel support table with a tube loading station, a sheet wrapping station, a sealing station, and a discharge station; at least one hollow, air permeable mandrel supported on the table; table drive means for indexing the mandrel sequentially to each of the stations; and a vacuum chamber extending from the tube wrapping station to the sealing station, the vacuum chamber drawing a vacuum inside the mandrel at and between the wrapping and sealing stations.

The apparatus may further include a tube feeder for feeding tubes to the tube loading station; a sheet feeder for feeding sheets of filter material to the wrapping station; and a sealer at the sealing station for sealing the sheet around the circumference of the tube. A mandrel drive means is also provided for rotating the mandrel at the wrapping station to wrap the sheet around the circumference of the tube, and a locking means is provided to prevent the mandrel from rotating when the mandrel is indexed from the wrapping station to the sealing station.

In the preferred embodiment, the mandrel support table rotates about a central axis and has four mandrels equally spaced around the periphery of the table and rotatably secured to the table at their inner ends. A lesser or greater number of mandrels is contemplated by the present invention, however. Table drive means is provided to sequentially index the table to bring each mandrel to successive stations. Preferably, the table is positioned to rotate in a vertical plane about a horizontal axis, with each mandrel being positioned to extend horizontally from the table.

The tube feeder used to convey tubes to the mandrel includes a tube conveyor, such as an inclined surface, for moving tubes to the tube loading station, and an ejector adapted to eject a tube from the conveyor onto the successive mandrels when the mandrels are indexed to the tube loading station.

The sheet feeder includes a conveyor having a continuous, air permeable, sheet support belt with a discharge end at the tube wrapping station. A vacuum source in located beneath the surface to draw a vacuum through the upper, horizontal belt surface, and thus hold sheets carried thereon in position. The sheet feeder further includes a supply roller for supporting a roll of filter material, a draw roller for continuously withdrawing a band of filter material from the roller, and a cutter for cutting the filter material into sheets or units of the desired size and shape.

The sealing means is adapted to engage the overlap or seam after the seam is wrapped around the tube, and while the sheet is held in position by the vacuum. The sealer includes a sealing bar adapted to engage the overlapped portion of the covering. An actuator may be used to move the bar between a retracted position away from the wrapped tube and an extended position engaging at least a part of the seam.

Many of the tubes that can be covered in accordance with the present invention include spaced peripherally extending ridges are ribs. When covering these tubes, the bar may positioned to contact the covering seam or overlapping edges of the sheet on the ridges. The surface of the bar contacting the tube covering may be of different configurations. For example, the bar may be have discontinuous projections or teeth, so that the bar only contacts the overlapping edges of the sheet at a plurality of spaced areas on the ribs. Alternatively, the bar surface may have a convex or concave radius to provide a lesser or greater contact with the tube covering.

The sealing means also includes a power source, such as a heater, to impart energy to the overlap and tube areas beneath the bar, and thereby melt a part of the overlapping edges of the sheet and tube sufficient to produce a sealing bond.

In the practice of the method of the invention, a sheet of filter material is secured around the circumference of a cylindrical tube by the steps of providing a cylindrical tube having a continuous, air permeable, outer circumference and a hollow interior; providing a sheet of filter material having parallel leading and trailing edges, the edges being spaced at a distance greater than the circumference of the tube; drawing a vacuum within the interior of the tube while feeding the leading edge of the sheet into engagement with the tube circumference, the leading edge being axially aligned with the tube; wrapping the sheet around the circumference of the tube with the edges being overlapped; and sealing the edges of the sheet to each other and to the tube. The sheet may be wrapped around the tube by rotating the tube while the sheet is being fed.

It has surprisingly been found that the performance of the cover sheet is significantly improved when the cover is wrapped counter-clockwise, i.e in the opposite direction to the direction the yarn is normally wrapped, so that the yarn, when unwrapped from the tube will be unwrapped in the same direction as the overlap, significantly reducing snagging of the yarn on the overlapping edges of the covering sheet.

In the preferred embodiment, the tube is wrapped at a first station and the edges and tube are adhered at a second station, with the tube being moved from the first station to the second station while maintaining a vacuum within the interior of the tube. The method also includes the step of cutting the sheet from a roll of filter material and conveying the sheet to the tube.

Accordingly, one aspect of the present invention is to provide an apparatus for covering a textile dye tube with a filter sheet. The apparatus includes: (a) a hollow mandrel for supporting the tube, at least a portion of the outer surface of the mandrel having a plurality of openings; (b) a vacuum source connected to the mandrel for drawing the sheet against the mandrel; and (c) sealing means for bonding the overlapping edges of the sheet to one another.

Another aspect of the present invention is to provide an apparatus for attaching a thermoplastic filter sheet to a textile dye tube. The apparatus includes: sealing means for bonding the sheet edges to each other and to the tube, the sealing means including a heating bar movable between a retracted position and an extended position in contact with the sheet wrapped tube.

Still another aspect of the present invention is to provide an apparatus for covering a textile dye tube with a filter sheet. The apparatus includes: (a) a hollow mandrel for supporting the tube, at least a portion of the outer surface of the mandrel having a plurality of openings; (b) a vacuum source connected to the mandrel for drawing the sheet against the mandrel; (c) sealing means for bonding the overlapping edges of the sheet to each other and to the tube, the sealing means including a heating bar movable between a retracted position and an extended position in contact with the sheet wrapped tube; and (d) means for wrapping the sheet around the tube in a counter-clockwise direction with respect to the direction of yarn.

These and other aspects of the present invention will become apparent to those skilled in the art after a reading of the following description of the preferred embodiment when considered with the drawings.

BRIEF DESCRIPTION OF THE DRAWINGS

FIG. 4 is an enlarged top view of the cover sealer;

FIG. 5 is an enlarged side view of the cover sealer; and

FIG. 6 is a perspective view of a dye tube with the cover sealed in place illustrating the covering wrapped in the opposite direction to the direction the yarn will be wrapped, thereby significantly reducing snagging of the yarn on the overlapping edges of the cover sheet when the yarn is unwrapped.

DESCRIPTION OF THE PREFERRED EMBODIMENTS

Figure 1:
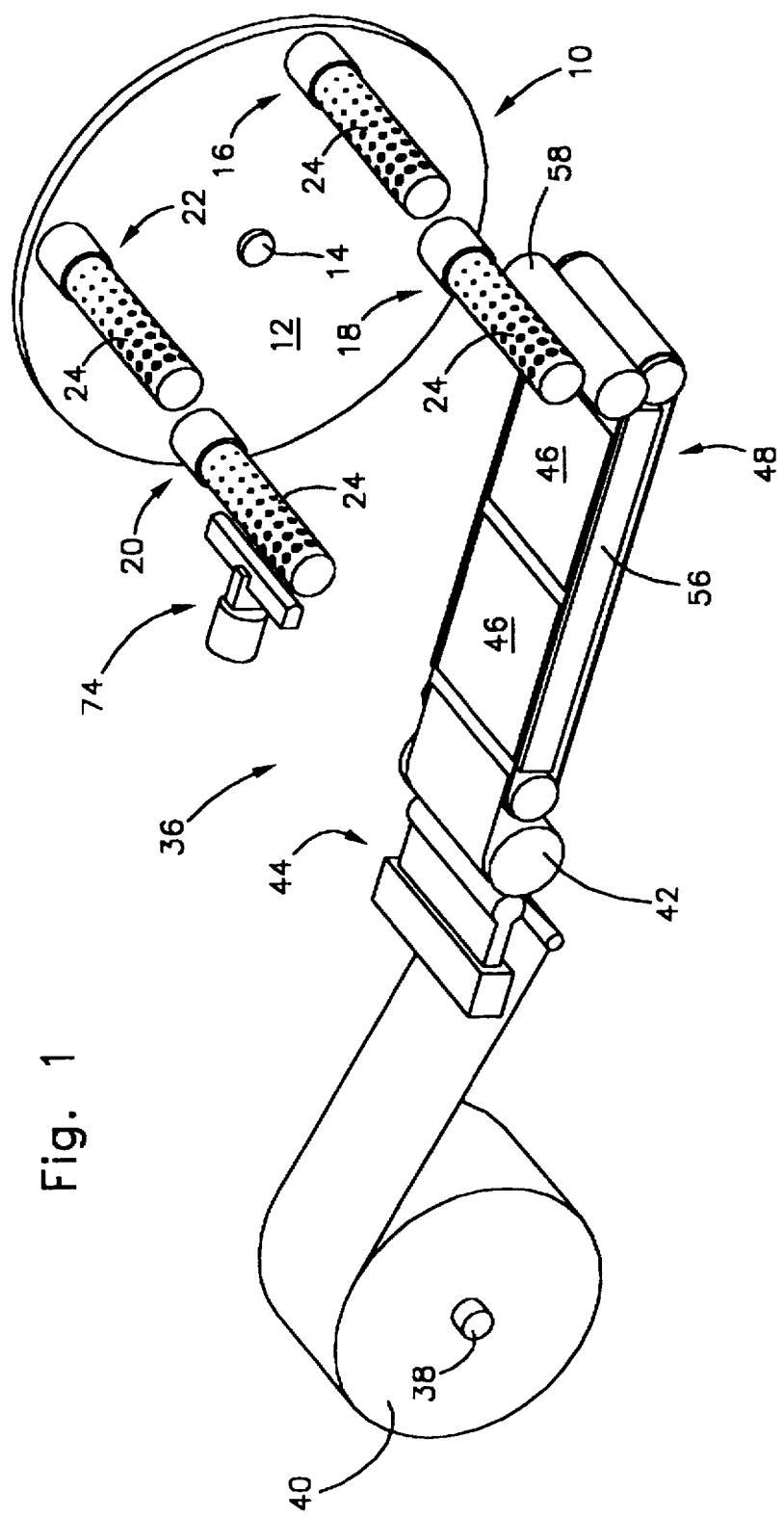
FIG. 1 is perspective view of an apparatus for covering a textile dye tube constructed according to the present invention with the supporting frame removed for clarity of illustration.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Figure 2:
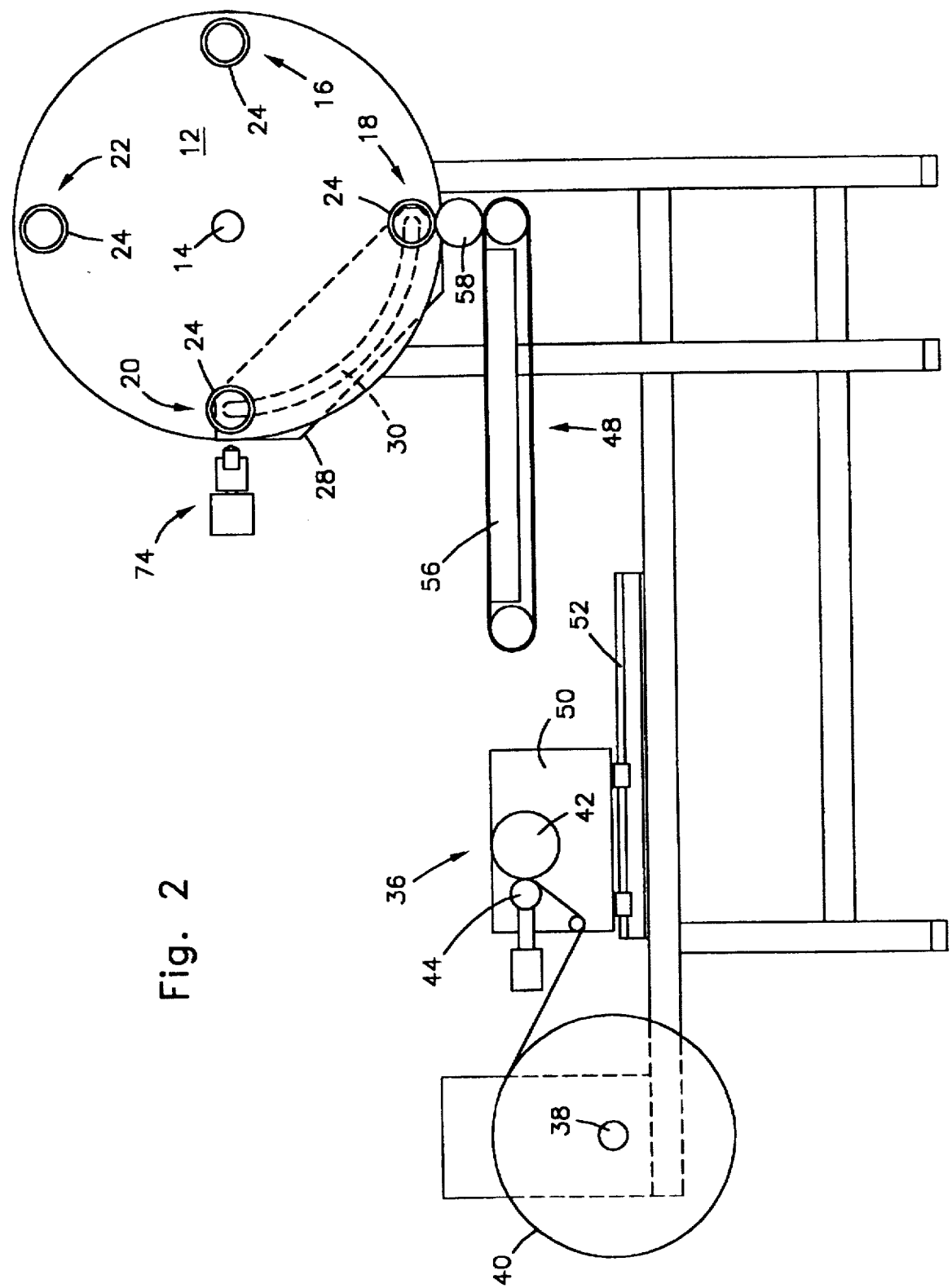
FIG. 2 is a side view of the apparatus shown in FIG. 1.
Figure 3:
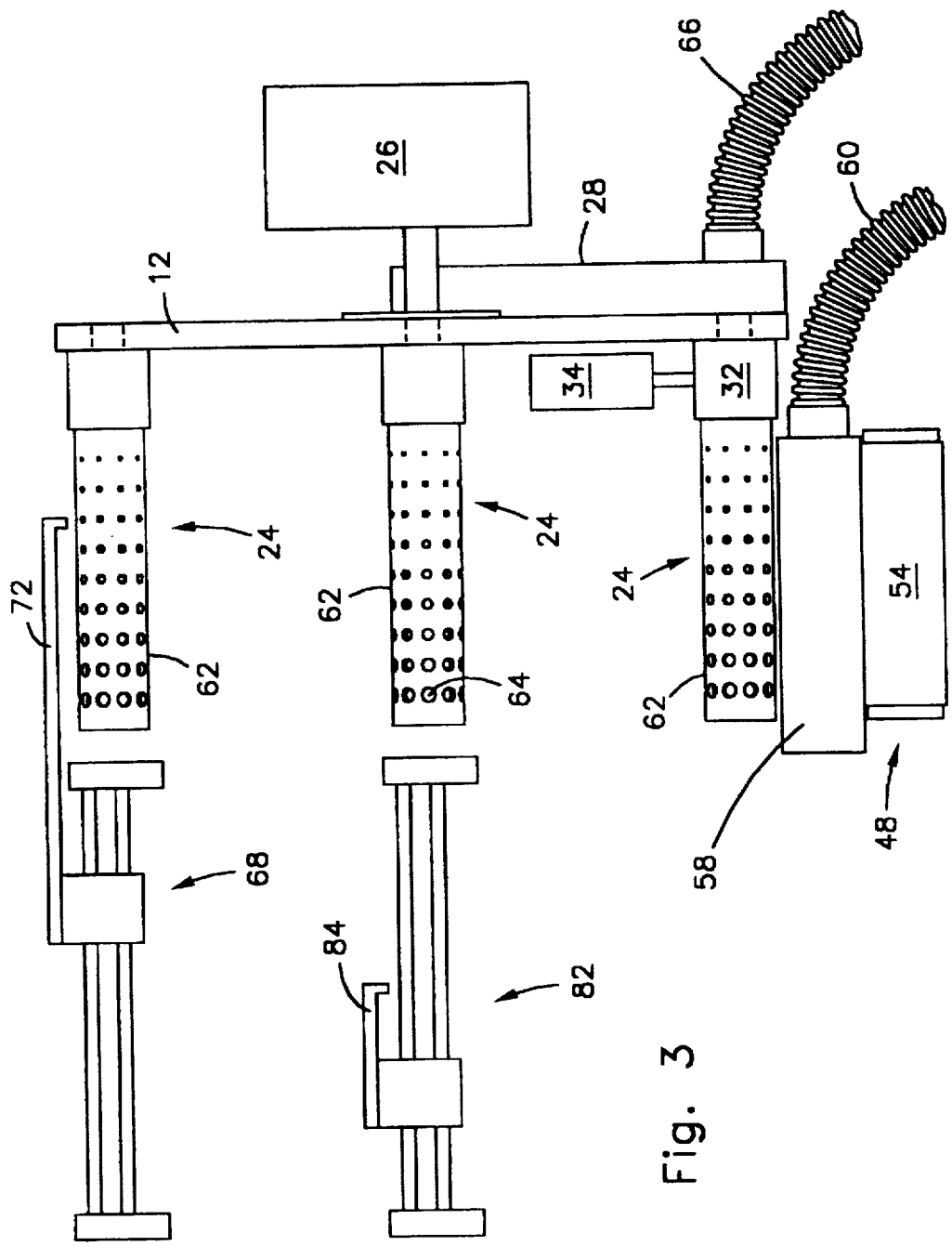
FIG. 3 is an enlarged end view of the mandrel supporting table, showing the positioning of the mandrels thereon, and the relationship of the cover conveyor to the sheet wrapping station.

Referring now to the drawings in general and FIG. 1 in particular, it will be understood that the illustrations are for the purpose of describing a preferred embodiment of the invention and are not intended to limit the invention thereto. As best seen in FIGS. 1 and 2, an apparatus constructed according to the present invention is shown consisting of a turntable, generally 10; a sheet feeder, generally 36; and a cover sealer, generally 74.

Turntable 10 includes a rotatable, mandrel supporting table 12, positioned to rotate about a horizontal axle 14. Table 12 has equally spaced around its periphery, a tube loading station 16, a sheet wrapping station 18, a sealing station 20, and a discharge station 22. A hollow, air permeable mandrel 24, to be described in detail hereinafter, is shown supported at each station on table 12. Table drive means 26 is operatively associated with axle 14 to rotate table 12, thereby indexing the mandrels carried thereon sequentially to each of the stations.

Turntable 10 further includes a vacuum chamber 28 extending from behind sheet wrapping station 18 to sealing station 20. Vacuum chamber 28 is adapted to draw a vacuum inside mandrels 24 at and between wrapping station 18 and sealing station 20. Chamber 28 includes a channel 30 toward the back of table 12 along the pathway of mandrels 24 being indexed from wrapping station 18 to sealing station 20, providing a vacuum within mandrels 24 at and between stations 18 and 20.

A mandrel drive means 32 is positioned at the inner end of mandrel 24 to rotate a mandrel 24, when positioned at station 18, one revolution during wrapping. A mandrel lock 34 is positioned adjacent each mandrel position to prevent mandrel 24 from rotating when being carried on table 12 from station 18 to station 20.

Sheet feeder 36 includes a sheet roll support axle 38 for carrying a roll of cover sheet material 40, a sheet draw roller 42 for drawing continuous sheet from roll 40, and a reciprocal cutter 44 positioned adjacent to, and axially aligned with, draw roller 42, for periodically severing 40 into rectangular sheets 46. Conveyor 48 is positioned to receive sheets from draw roller 42. Draw roller 42 and cutter 44 are supported on a carrier frame 50 slidably positioned on bars 52 so that sheet feeder 36 can be withdrawn for ease of servicing.

Conveyor 48 includes a continuous foraminous band 54 having a horizontal upper surface. A vacuum chamber 56 is positioned beneath the upper surface of band 54, and is adapted to draw air down through the band surface to hold sheet units carried on the surface. A drive means, not shown, is provided to drive band 54 away from roller 42 and towards tube wrapping station 18.

A transfer roller 58 is positioned at the discharge end of conveyor 48 beneath station 18, and is adapted to transfer sheet 46 from conveyor 48 to mandrel 24. The interior of roller 58 communicates with a vacuum source, not shown, by way of vacuum line 60 and includes a porous surface so that sheets engaging exiting from conveyor 48 are held against roller 58 until engaging mandrel 24.

Mandrel 24 includes a continuous hollow cylinder 62 extending from a rotatably mounted, inner end toward table 12 to a free distal end. A plurality of axially aligned, spaced rows of perforations 64 extend through cylinder 62 into its interior. Perforations 64 increase in diameter from the inner end toward the distal end of cylinder 62, so that a uniform vacuum can be drawn on the surface of cylinder 62 when a vacuum is applied to the interior of the mandrel through vacuum line 66, extending to a vacuum source, not shown.

Tube feeder 68 is positioned adjacent tube loading station 16 for feeding tubes 70 onto mandrels 24 positioned at loading station 16. Feeder 68, which may be loaded with tubes by hand, or from a supply source, such as an inclined delivery surface, not shown Feeder 68 includes a tube pusher 72 to feed tubes 70 onto mandrel 24 at loading station 16.

Cover sealer 74, positioned adjacent cover sealing station 20 includes an actuator 76 controlling sealing bar 78, which includes a contact edge 80 axially aligned with mandrel 24 at sealing station 20. Actuator 76 is designed to reciprocate bar 78 between a retracted position and an extended position whereat bar edge 80 engages the overlapping edges or seam of sheet 46 after sheet 46 is wrapped around tube 66, and while sheet 46 is held in position by a vacuum drawn into mandrel 24 by vacuum chamber 28. Sealer 74 also includes an energy source, not shown, such as a heater or ultrasonic power source, to impart energy to areas engaged by bar edge 80, and thereby melt a part of the overlapping edges of the sheet and tube sufficient to produce a sealing bond.

Tube unloader 82, positioned at tube discharge station 22, includes a tube retractor 84 positioned to withdraw covered tubes 70 from mandrel 24 at station 22. The covered tubes can then be discharged or carried to a desired location.

The construction of the filter sheet is not critical to the present invention, so long and the sheet is permeable to the dye bath, and prevents yarn from adhering to the dye tube. Desirably, the sheet is of the same chemical composition as the dye tube to permit recycling without separation of the sheet from the tube. The sheet may be of nonwoven fibers. Also, the sheet can be a perforated, film, e.g. a thermoplastic film, such as polypropylene, with perforations therein to permit entry of the dye bath.

Various type of tubes can be covered with the present invention, with mandrels of different lengths and diameters being positionable on the table to permit wrapping of different size tubes. Also, the width of the sheet material, and the frequency at which it is cut, can be adjusted.

Generally, the process of the invention comprises providing a cylindrical tube having a continuous, air permeable, outer circumference and a hollow interior; providing a sheet of filter material having parallel leading and trailing edges, the edges being spaced at a distance greater than the circumference of the tube; rotating the tube around its axis while drawing a vacuum within the interior of the tube and feeding the leading edge of the sheet into engagement with the tube circumference, thereby wrapping the sheet around the circumference of the tube with the edges being overlapped; and sealing the edges of the sheet to each other and to the tube while maintaining the vacuum.

In operation of the preferred embodiment, mandrels 24 are positioned at tube loading station 16, sheet wrapping station 18, sealing station 20, and discharge station 22. A dye tube 70 is positioned over mandrel 24 at loading station 16, and mandrel 24 with tube 70 thereon is then indexed to wrapping station 18. It is to be understood that the operation of the preferred apparatus, and thus the process, is continuous in nature. Therefore, during operation, different tubes will be loaded, wrapped, sealed and unloaded at the different stations at the same time, and then indexed to the next station.

At wrapping station 18, sheet 46 is fed into contact with tube 70 with the leading edge of sheet 46 parallel to the axis tube 70. Tube 70 is rotated one revolution to wrap sheet 46 around the periphery to tube 70, with the leading and trailing edges of sheet 46 overlapping. Sheet 46 is drawn against the periphery of tube 70 and held in place by drawing a vacuum into the interior of tube 70 during wrapping.

Tube 70, with sheet 46 wrapped thereon and held in position by a vacuum, is then indexed to cover sealing station 20, where at contact edge 80 of bar 78 engages the overlapping edges or seam of sheet 46 to melt at least a part of the overlapping edges of the sheet and tube sufficient to produce a sealing bond. When the structure of tube 70 includes a plurality of peripherally extending ridges or projections, the sealing bar edge 80 engages the surface of sheet 46 on these ridges to seal sheet 46 to itself and to tube 70 on the ridges.

Tube 70, with sheet 46, sealed thereon, is then indexed to tube discharge station 22, whereat tube 70 is retracted from mandrel 24. Empty mandrel 24 is then indexed to tube loading station 16 to again initiate the sequence.

It has surprisingly been found that the performance of the covering is significantly improved when the covering is wrapped counter-clockwise, i.e in the opposite direction of the direction the yarn was wrapped on the tube. For example, tubes covered as taught by U.S. Pat. No. 4,621,508 to Baxley, Jr., which are in the conventional clockwise direction, i.e. in the same direction in which the yarn was wrapped, were more likely to cause breakage during off-winding due to entanglement with the leading edge of the filter covering than tubes wrapped in the direction of the present invention.

Certain modifications and improvements will occur to those skilled in the art upon a reading of the foregoing description. By way of example, the turntable could only include two positions, with loading and wrapping being done at the first position, and sealing and unloading being done at the second position. Also, other specific mechanisms can be used for loading, tube positioning, wrapping, sealing, and unloading, so long as the objectives of the present invention are achieved. It should be understood that all such modifications and improvements have been deleted herein for the sake of conciseness and readability but are properly within the scope of the following claims.

We claim:

1. An apparatus for covering a textile dye tube with a thermoplastic filter sheet, said apparatus comprising:
   (a) a hollow mandrel for supporting said tube, at least a portion of the outer surface of said mandrel having a plurality of openings;
   (b) a vacuum source connected to said mandrel for drawing said sheet against said mandrel;
   (c) sealing means for bonding the overlapping edges of said sheet to each other and to said tube, said sealing means including a heating bar movable between a retracted position and an extended position in contact with said sheet wrapped tube;
   (d) means for wrapping said sheet around said tube in a direction opposite to the direction the yarn is wrapped, thereby significantly reducing snagging of the yarn on the overlapping edges of the sheet when the yarn is unwrapped;
   (e) a mandrel support table having a tube loading station, a sheet wrapping station, a sealing station, and a discharge station;
   (f) table drive means for indexing said mandrel sequentially to each of said stations;
   (g) said vacuum source including a vacuum chamber extending from said tube wrapping station to said sealing station, said vacuum chamber drawing a vacuum inside said mandrel at and between said wrapping and sealing stations;
   (h) a tube feeder for feeding tubes to said tube loading station;
   (i) a sheet feeder for feeding sheets of filter material to said wrapping station; and
   (j) said sealing means disposed at said sealing station for sealing said sheet around the circumference of said tube.

2. The apparatus according to claim 1, further including a mandrel drive means for rotating said mandrel at said wrapping station to wrap said sheet around the circumference of said tube.

3. The apparatus according to claim 1, further including locking means for preventing said mandrel from rotating when said mandrel is indexed from said wrapping station to said sealing station.

4. The apparatus according to claim 1, including four mandrels adapted to sequentially move to each of said stations.

5. The apparatus according to claim 1, wherein said table is positioned to rotate in a vertical plane, with said mandrel being positioned horizontally on said table.

6. The apparatus according to claim 1, wherein said sheet includes spaced leading and trailing edges positioned parallel to the axis of said tube, said edges being spaced at a distance greater than the circumference of said tube.

7. The apparatus according to claim 6, wherein said sheet feeder includes a conveyor having a movable sheet support surface with a discharge end at said tube wrapping station and a vacuum source beneath said surface.

8. The apparatus according to claim 7, wherein said sheet feeder further includes a supply roller for supporting a roll of filter material, a feed roller for withdrawing said filter material from said roller, and a cutter for cutting said filter material into said sheets.

9. The apparatus according to claim 1, wherein said tube feeder includes a tube conveyor and an ejector adapted to eject a tube from said conveyor onto said mandrel when said mandrel is indexed to said tube loading station.

10. The apparatus according to claim 1, wherein said bar is toothed, whereby said bar contacts said sheet wrapped tube at a plurality of spaced areas.

11. The apparatus according to claim 10, wherein said dye tubes include spaced circumferential ridges and said bar is positioned to contact said sheet wrapped tube on said ridges.

12. The apparatus according to claim 1, wherein said bar is heated to a temperature sufficient to melt said sheet.

13. The apparatus according to claim 12, wherein said bar is heated to a temperature of between about 400° F. and 450° F. to attach said sheet to said tube.

14. An apparatus for covering a textile dye tube with a filter sheet, said apparatus comprising:
   (a) a mandrel support table;
   (b) a hollow mandrel supported by said table, at least a portion of the outer surface of said mandrel having a plurality of openings;
   (c) a tube loading station for loading a textile dye tube onto said mandrel;
   (d) a sheet wrapping station for wrapping a thermoplastic filter sheet around said tube;
   (e) a sealing station for sealing said sheet to said tube;
   (f) a discharge station for extracting said tube and sealed sheet from said mandrel; and
   (g) table drive means for indexing said mandrel sequentially to each of said stations, whereby a textile tube is wrapped with said sheet and said sheet is sealed to said tube.

15. The apparatus according to claim 14, further including a vacuum chamber extending from said tube wrapping station to said sealing station, said vacuum chamber drawing a vacuum inside said mandrel at and between said wrapping and sealing stations.

16. The apparatus according to claim 14, further including a tube feeder for feeding tubes to said tube loading station.

17. The apparatus according to claim 14, further including a sheet feeder for feeding sheets of filter material to said wrapping station.

18. The apparatus according to claim 14, wherein said sealing station includes a heating bar movable between a retracted position and an extended position in contact with said sheet wrapped tube.

19. The apparatus according to claim 18, wherein said dye tube includes a plurality of ridges and said heating bar contacts said sheet on said ridges when said bar is in an extended position, to heat seal sheet to said ridges.

* * * * *